United States Patent Office 3,413,076
Patented Nov. 26, 1968

3,413,076
DYEING NITRIC ACID TREATED FORMED POLY-
PROPYLENE OBJECTS CONTAINING FATTY
ACID DIAMIDES OF ALKYLENE DIAMINES
Akio Koshima and Hirohisa Nara, Uji-shi, Kyoto-fu,
Japan, assignors to Nippon Rayon Co., Ltd., Uji-shi,
Kyoto-fu, Japan, a corporation of Japan
No Drawing. Continuation of application Ser. No. 251,488,
Jan. 15, 1963. This application Feb. 7, 1967, Ser. No.
614,519
2 Claims. (Cl. 8—31)

ABSTRACT OF THE DISCLOSURE

The present disclosure shows the blending of polypropylene with bisamides or biscarbamates of alkylene diamines or alkylenedioic acids and then applying nitric acid to the blend to get a readily dyeable polypropylene product. In one example, methylene-bistearamide blended with polyproplene and extruded into a fiber is treated with nitric acid. Other acids such as HCl, $H_2SO_4$, $H_3PO_4$, HI, HBr, HF, oxalic acid and paratoluene sulfonic acid can be used. After acidification alkylene diamines and ethylenimine are applied to the fiber.

---

This is a continuation of Ser. No. 256,488, now abandoned.

The present invention relates to a process for improving the dyeability of fibers and other articles formed of polypropylene.

Though the fibers and other articles formed of polypropylene have good mechanical properties, it is difficult to dye them satisfactorily by using conventional dyestuffs and dyeing methods, because polypropylene has no acceptable groups for dyestuffs and has a very compact structure.

To improve the dyeability of polypropylene, many methods have been attempted, for example, as by blending polypropylene with resins, such as epoxy resin, polyamide, polyurethane, polyester and polyurea, and by the adoption of a chemical treatment to the polypropylene, such as a sulfonation, an acid treatment, or a chlorination. When polypropylene is blended with other resins having good affinity for dyestuffs, however, there is incompatibility and the resulting materials become opaque by disassociation. Moreover there are many difficulties in subsequent spinning, drawing or shaping processes.

The method which comprises treating the fibers produced of polypropylene with a sulfonating agent or chlorosulfonating agent and then subjecting them to an amination to increase the affinity for acid dyestuffs is known, but in this case the fibers are seriously damaged by the sulfonating or chlorosulfonating agents which produce a decrease in the tensile strength. Additionally, a very complicated operation is necessary to remove such sulfonating or chlorosulfonating agents. And further, the method is known, wherein after melt-spinning of polypropylene materials blended with primary aliphatic amine compounds, the obtained materials are immersed first in hydrochloric acid and then dyed with cationic dyestuffs, but by this method the unmixing is caused in melt-mixing process owing to bad compatibility among polypropylene and amine compounds, therefore proceeding spinning and drawing processes become extremely difficult, and the obtained fibers lose their transparency. Besides, very often the amine compounds migrate towards the surface of the fiber in the acid treatment, scouring, dyeing and the like proecsses. When the fibers produced of polypropylene are subjected to merely the chemical treatments, they are dyed in pale shades, and if the fibers are severely subjected to the chemcial treatment to dye in deep shades, tensile strength of them falls remarkably.

It is the object of the present invention to provide a process for improving dyeability of the fibers and the shaped articles of polypropylene which has not the above-mentioned defects.

According to the present invention, there is provided a process for improving dyeability of the fibers and articles formed of polypropylene characterized in that polypropylene is blended with from 0.2 to 20% on the weight of polypropylene of at least one compound selected from the groups consisting of bis-amides and bis-urethanes represented by the following formula:

$$R_1X_1R_2X_2R_3$$

wherein $R_1$ and $R_3$ stand for alkyl group containing from 1 to 10 carbon atoms, $R_2$ stands for a short chain alkylene group containing from 1 to 10 carbon atoms and $X_1$ and $X_2$ stand for —NHCO—, —CONH—, —NHCOO— or —COONH— groups, and then the fibers or other articles which are produced from the blended polypropylene, are treated with at least one acid selected from the groups of inorganic acids and organic acids .

Bis-amide and/or bis-urethane compounds used in the present invention have good compatibility with polypropylene, cause no unmixing or disassoication in melt-spinning process, give no trouble in spinning and drawing processes and can maintain the obtained fibers transparent. The deep shades are obtained with cationic dyestuffs after acid treatment without any tendency for the blended compounds to migrate towards the fiber surface during such aftertreatments. Above all, having good compatibility with polypropylene as described above, bis-amide and/or bis-urethane compounds can be used together with the compounds having poor compatibility with polyroylene, e.g. aliphatic amine compounds, in the mixing process, and prevent disassociation of incompatible compounds.

When the nitric acid is treated in the present invention, the blended polypropylene has to be rinsed in water sufficiently, and further is treated with water soluble aliphatic amine compounds. By these treatments the excellent affinity of the fiber to anionic dyestuffs, such as acid dyestuffs, direct dyestuffs, chrome dyestuffs, metal complex dyestuffs and reactive dyestuffs, is obtained and the dyed materials have very deep shades and good fastness. Namely, is the case of this invention polypropylene fibers and the shaped articles, blended with at least one compound selected from bis-amide and/or bis-urethane compounds, treated in nitric acid briefly after spinning and drawing or shaping processes, and further treated with aliphatic amine compounds, showed little damage in tensile strength. Besides it is sufficient only with water rinse to remove excess nitric acid and amine compounds on the fibers. They are also dyed in deep shades with anionic dyestuffs.

The reasons why the polypropylene thus obtained in the present invention can be dyed very easily with cationic and anionic dyestuffs are not clear, but high affinity for cationic dyestuffs would be attributed to the easy penetration of acids into the fibers or the shaped articles, owing that the molecular arrangement of the fibers or the shaped articles in amorphous region becomes considerably disordered by blending the said compounds, and to the formation of sites for cationic dyestuffs, owing that the blended compounds and polypropylene apt to be subjected to chemical change by acids.

And the high affinity for anionic dyestuffs would be attributed to highly amination of the fibers, besides above reasons, owing that the parts subjected to chemical change by nitric acid are activated and easily aminated.

Before spinning or molding, these bis-amide and/or bis-urethane compounds are blended with polypropylene from 0.2% to 20% on the weight of polypropylene.

In order to dye the blended fibers with cationic dyestuffs, the acid treatment with organic and/or inorganic acids, such as hydrochloric acid, nitric acid, sulfuric acid, phosphoric acid, hydroiodic acid, hydrobromic acid, hydrofluoric acid, oxalic acid, and paratoluene sulfonic acid, and the mixtures thereof gives good results.

In order to dye these fibers with anionic dyestuffs, a nitric acid and then amine treatments are carried out. The compounds used in the amine treatment are aliphatic amines, and especially ethylene-diamine, hexamethylene-diamine, diethylene triamine, triethylene-tetramine, tetraethylene-pentamine and ethylenimine give good results.

The concentration of the acids or the amines in these treatments are above 1% (effective concentration) on the weight of the fiber, and the treatment is carried out for a few seconds to several hours and at above room temperature. They depend upon the form of the fibers or the shaped articles. These treatments and rinsing can be carried out in a continuous or a discontinuous process. Besides, after the acid treatment, if necessary, the fibers can be neutralized with a weak alkaline solution.

The following examples serve to illustrate the present invention, but they are not intended to limit it thereto.

EXAMPLE 1

Crystalline polypropylene material having an average molecular weight fo 77,000 was blended with 5% of methylene-bis-stearamide and drawn to a length of 5 times the original one after melt-spun at 240° C. The resulted fiber was then immersed in an aqueous hydrochloric acid solution (effective concentration 20%) for 30 min. at 100° C. and neutralized with an aqueous sodium carbonate solution and rinsed with water sufficiently.

The tenacity (5.40 g./d.) and the elongation (35.1%) of thus obtained fiber were nearly equal to those physical properties of the non-blended and untreated polypropylene fibers.

The fiber thus treated was found to be dyed in sufficiently deep shades when dyed in a weak alkaline dye bath containing 5% (O.W.F.) of a cationic dyestuff such as Methylene Blue FZ (C.I. Basic Blue 9 C.I. 52015) or Astrazon Orange R (C.I. Basic Orange 22 C.I. 48040) for 30 min. at 100° C. But the fiber produced of polypropylene alone and subjected to acid treatment was found to be dyed in only pale shades under the same dyeing condition.

EXAMPLE 2

The fiber which was prepared by blending 5% of methylene-bis-palmitamide with crystalline polypropylene, was sufficiently rinsed as described in Example 1 after treating with 20% (effective concentration) aqueous solution of nitric acid for 30 min. at 100° C.

The resulted fiber was found to be dyed in sufficiently deep shades when dyed in a weak alkaline bath containing a cationic dyestuff, such as Malachite Green (C.I. Basic Green 4 C.I. 42000), for 30 min. at 100° C.

EXAMPLE 3

The fiber produced of polypropylene blended with 5% of methylene-bis-stearamide and 5% of methylene-bis-lauramide, was treated with a 20% aqueous solution of hydrogen iodide at 100° C. for 30 min. and thereafter rinsed with water sufficiently. Thus treated fiber was dyed in a weak alkaline dyebath containing a cationic dyestuff, such as Malachite Green (C.I. Basic Green 4 C.I. 42000), at 100° C. for 60 min. Dyed materials have very deep shades.

EXAMPLE 4

Crystalline polypropylene material having an average molecular weight of 77,000 was blended with 5% of methylene-bis-stearamide and subsequently drawn at a draw ratio of 5, after being melt-spun at 240° C. The resulting fiber was immersed in a 30% (by weight) nitric acid solution at 100° C. for 60 min., rinsed with water sufficiently, then also immersed in a 30% aqueous solution of diethylene-triamine at 80–90° C. for 60 min. and finally rinsed with water sufficiently.

The tenacity and the elongation of thus treated fiber were 4.80 g./den. and 28.5% respectively, while those of the untreated were 5.20 g./den. and 29.5%. The differences between the treated fiber and the untreated are as small as negligible.

Thus treated fiber was dyed in an acid dye bath containing 5% (O.W.F.) of an acid dyestuff, such as Fenalan Violet 3B (C.I. Acid Violet 43 C.I. 60730) at 100° C. for 60 min. The dyed materials thus obtained were approximately same deep shades as nylon 6 fiber dyed with the same dyestuffs under the same conditions as described above. However, fiber produced of polypropylene alone was hardly dyed, even if treated with a nitric acid solution and amines under the same conditions as described above.

EXAMPLE 5

The fiber produced of polypropylene blended with 5% of methylene-bis-stearamide and 3% of bis-urethane prepared from ethylene glycol and palmithyl iso-cyanate, was immersed in a 50% (by weight) nitric acid solution at 100° C. for 5 min., thereafter rinsed with water sufficiently, then also immersed in a 50% (by weight) aqueous solution of hexamethylene diamine at 80–90° C. for 60 min. and finally rinsed with water sufficiently.

Thus treated fiber was dyed in an acid dye bath containing 5% (O.W.F.) of an acid dyestuff, such as Solway Purple R (C.I. Acid Violet 43 C.I. 60730), at 100° C. for 60 min. The dyed materials thus obtained were approximately same shades as nylon 6 fiber dyed with the same dyestuffs under the same condition.

EXAMPLE 6

The fiber produced of polypropylene blended with 5% of methylene-bis-stearamide was immersed in a bath containing 80 parts of concentrated nitric acid and 20 parts of water at 100° C. for 15 min. and rinsed sufficiently. It was immersed again in a bath containing 50% triethylenetetramine aqueous solution at 90° C. for 60 min., and rinsed sufficiently.

The obtained fiber was dyed in very deep shades, when dyed in an acid dyebath containing 5% (O.W.F.) of an acid dyestuff, such as Solar Orange (C.I. Acid Orange 7 C.I. 15510), Supramine Red B (C.I. Acid Red 6 C.I. 14680) or Supramine Green (C.I. Acid Green 37 C.I. 62515) FB.

We claim:
1. A process for producing a dyed product formed of polypropylene blended with from 0.01 to 20% by weight of the polypropylene of a bisamide of the formula

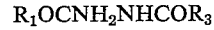

$$R_1OCNH_2NHCOR_3$$

wherein each of $R_1$ and $R_3$ is an alkyl group containing from 8 to 20 carbon atoms and $R_2$ is a short chain alkylene group, said process comprising the steps of: treating said polypropylene with nitric acid and then with dyestuff.

2. A process according to claim 1, comprising the further step of treating said polypropylene with an aliphatic primary amine containing more than 8 carbon atoms.

References Cited

UNITED STATES PATENTS

| | | |
|---|---|---|
| 2,973,241 | 2/1961 | Scott et al. |
| 2,991,264 | 7/1961 | Monroe et al. |
| 3,098,697 | 7/1963 | Cappuccio et al. |
| 3,151,928 | 8/1964 | Cappuccio et al. |
| 3,137,989 | 6/1964 | Fior et al. |
| 3,165,492 | 1/1965 | Tholstrup et al. |

NORMAN G. TORCHIN, *Primary Examiner.*

DONALD LEVY, *Assistant Examiner.*